UNITED STATES PATENT OFFICE.

HUGH EDWARD PLUNKETT, OF MALDEN, MASSACHUSETTS, ASSIGNOR, BY MESNE ASSIGNMENTS, TO UNITED STATES TROPICAL FOOD COMPANY, OF MALDEN, MASSACHUSETTS, A CORPORATION OF MASSACHUSETTS.

METHOD OF PRESERVING BANANAS.

1,138,887.  Specification of Letters Patent.  Patented May 11, 1915.

No Drawing.  Application filed June 6, 1914. Serial No. 843,550.

*To all whom it may concern:*

Be it known that I, HUGH EDWARD PLUNKETT, of Malden, in the county of Middlesex and Commonwealth of Massachusetts, have invented certain new and useful Improvements in Methods of Preserving Bananas, of which the following is a specification.

My invention relates to a new and useful method of preserving bananas, and has for its object to enable bananas to be preserved indefinitely, without loss of the natural softness and flavor of the fruit.

My invention consists in the method or process hereinafter described and directly pointed out in the claims.

In carrying out my invention I peel a ripe banana and then subject the body to the action of steam in a closed receptacle until it is cooked without being dried or hardened. The steam acts to remove the surface stain or discoloration which a banana body usually derives from the rind, this stain being due to the ripening of the rind which gives the latter a dark color and in time similarly discolors the surface of the pulp or body. The steam melts or dissolves the surface of the body to a sufficient depth to remove the discoloration, the dissolved surface portion and the water formed by the condensation of the steam forming a thin liquid solution which flows from the fruit to the bottom of the receptacle. I then subject the cooked body to dry air, preferably at a temperature of from 70° to 100° F. until a crust is formed on its surface, the interior remaining soft. The crust thus formed enables the body to retain its shape when packed to exclude air from it. I then exclude air from the cooked and surface-dried body either by inclosing it, covered by syrup, in a can or jar, or by wrapping it in a flexible covering which is practically impervious to air, a suitable covering being paper treated with paraffin. It is preferable to assemble a number of bodies thus treated in a can or jar, when syrup is employed, or in a box or other package, not necessarily liquid tight, when syrup is not employed, each body being preferably wrapped separately and the assemblage of bodies inclosed in a package or wrapper, the bodies being closely packed like dates and figs.

The described product will keep a long time without change. It may be used for filling of chocolate creams, the body being cut into sections which may be coated with a mixture of starch and sugar and then dipped in chocolate. It may also be used alone as an article of food, or the preserved body may be crushed and used with ice cream, whipped cream, college ices, etc.

Having thus described the nature of my invention, what I claim as new and desire to secure by Letters Patent of the United States, is:—

1. A method of preserving bananas which consists, first; in removing the skin, second; in subjecting the body to steam in a closed receptacle whereby the body is cooked and the stain derived from the rind is removed, third; in partially drying the cooked body to form a surface crust thereon leaving the interior in a soft condition, and lastly in surrounding the pulp body to exclude air therefrom.

2. A method of preserving bananas which consists, first; in removing the skin, second; in subjecting the body to steam in a closed receptacle whereby the body is cooked and the stain derived from the rind is removed, third; in partially drying the cooked body to form a surface crust thereon leaving the interior in a soft condition, and lastly in packing the pulp body to exclude air therefrom.

In testimony whereof, I have signed my name to this specification in the presence of two subscribing witnesses, this 20th day of May, 1914.

HUGH EDWARD PLUNKETT.

Witnesses:
  GERTRUDE M. MARTIN,
  HAROLD J. HAM.